Nov. 6, 1934.   J. C. DIEHL   1,979,607
METER APPARATUS
Filed Jan. 3, 1931

INVENTOR
John C. Diehl
ATTORNEYS.

Patented Nov. 6, 1934

1,979,607

UNITED STATES PATENT OFFICE 1,979,607

METER APPARATUS

John C. Diehl, Erie, Pa., assignor to American Meter Company, New York, N. Y., a corporation of Delaware Application January 3, 1931, Serial No. 506,399

7 Claims. (Cl. 73—167)

Orifice meters are very accurate within certain ranges. When the flow is materially outside of this range difficulty is experienced in obtaining an accurate reading. The present invention is designed to correct this difficulty by introducing a separate meter for metering the lower range of flow which apparatus automatically cuts in the orifice meter when the range of flow reaches a point at which the orifice meter will operate with accuracy. Features and details of the invention will appear from the specification and claims.

A preferred embodiment of the invention is illustrated in the accompanying drawing as follows:—

Figure 1:
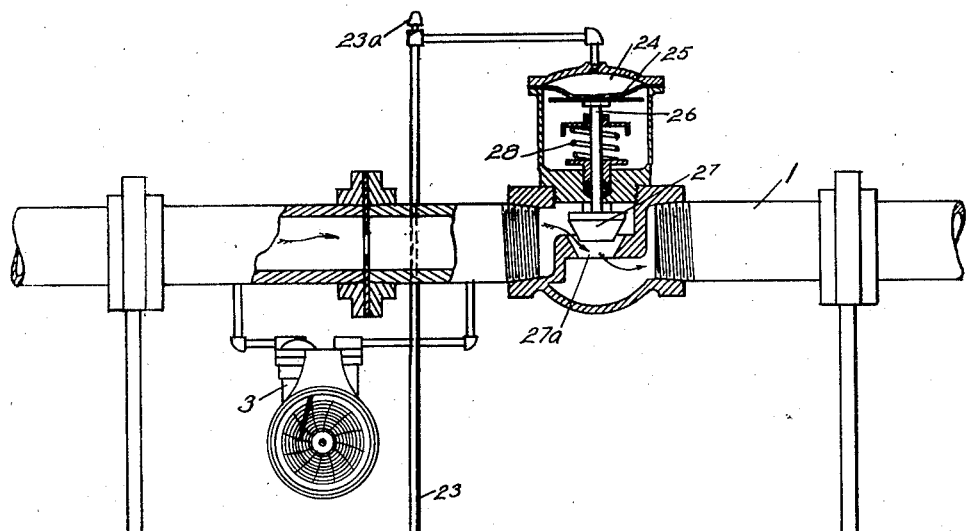

Fig. 1 shows an elevation, partly in section, of the apparatus.

Figure 2:
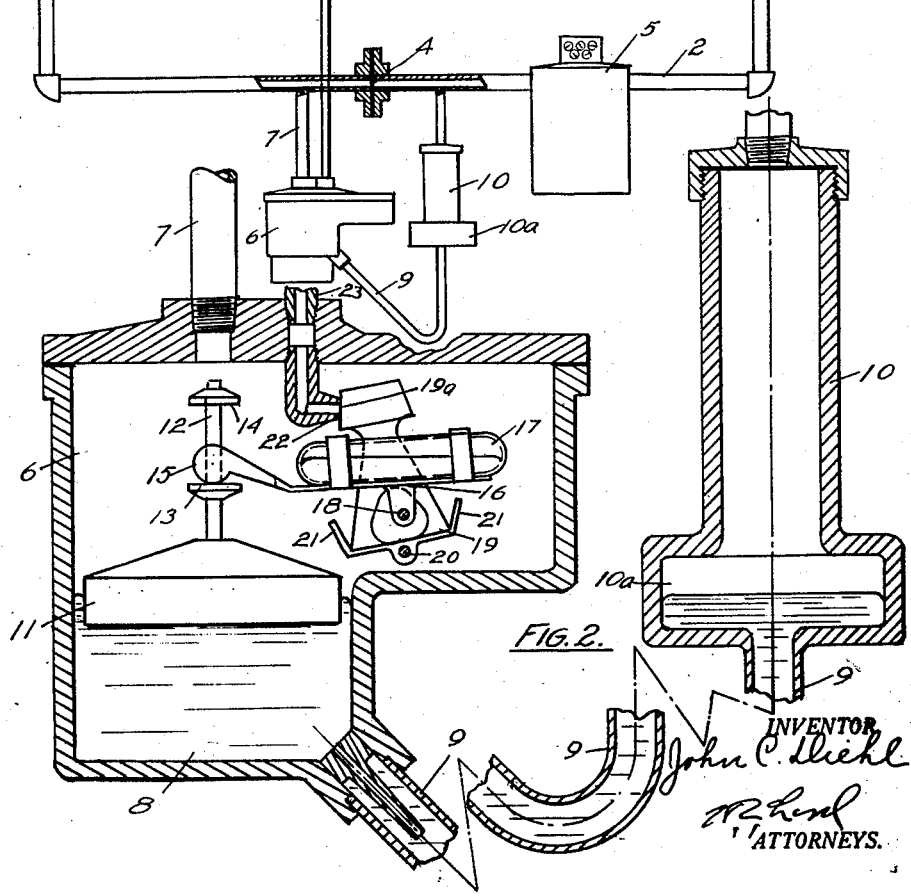

Fig. 2 a sectional view showing the control apparatus.

1 marks the main conduit, 2 a shunt conduit, 3 an orifice meter including the orifice and proper indicators, 4 a small orifice in the shunt line, and 5 a small meter, preferably a displacement meter.

An enclosed chamber 6 is connected by a pipe 7 with the high side of the shunt conduit. The chamber has a mercury well 8 which is connected by a tube 9 with a balancing well 10 connected with the low side of the shunt conduit. This balancing well has an enlargement 10a at its bottom. A float 11 is arranged in the well 8. The enlargement 10a is intended to increase very largely the movement of the float within a given range of differential pressure so as to make less sensitive its action on the controlling mechanism.

A stem 12 extends upwardly from the float 11 and is provided with operating shoulders 13 and 14. An end 15 of a tilting frame 16 is arranged in the path of the shoulders 13 and 14, the shoulders being so spaced as to provide considerable lost motion between them in their operation on the end 15. The frame 16 carries a loaded liquid tube 17 ordinarily loaded with mercury and is pivoted at 18. The lever end 15 is so related to the frame and its pivot that within the range of upward movement given to it by the float the frame is passed over the center and then moves through the gravity and the added weight of the included liquid in the tube to its reverse position in the well-known manner.

A rocker 19 is pivoted at 20 and has arms 21 which engage the under side of the frame 16 at the extremes of the movement of the rocker. The movement, however, given to the rocker by the frame is sufficient to move the rocker over the center and thus throw it back and forth with a reversal of movement due to the primary action of the shoulders 13 and 14. The rocker carries a valve end 19a which is adapted to act on a seat 22 controlling a tube 23.

The tube 23 extends to a chamber 24 above a diaphragm 25. The diaphragm is connected by a pin 26 with a valve 27, the valve closing an opening 27a in the main conduit. A spring 28 tends to open the valve and operates against the pressure above the diaphragm. When the pressure on the high side of the shunt conduit produces a differential which indicates a pressure in the main line above that which can be accurately measured through the orifice meter 3, this pressure acting on the well 8 depresses the mercury and with it the float 11. The shoulder 14 operates on the lever 15 and this actuates the tilting frame and rocker to close the valve 19a thus shutting off pressure to the chamber 24. A small leak 23a is provided permitting the escape of fluid from the chamber 24 and immediately this happens the spring 28 opens the valve 27 and permits a flow through the main conduit. With the valve 27 open gas passes both through the shunt and the main line and the total gas flow is indicated in the meters 3 and 5.

When the pressure, however, reduces in the conduit, this is reflected in the chamber 6 and the differential causes an upward movement of the float 11 and the shoulder 13 contacting the lever 15 tilts the tilting frame and with it the rocker, opening the valve 19a and permitting gas under pressure to pass into the chamber 24 and this overcoming the spring 28 closes the valve 27 from which time the entire metering is through the displacement meter 5.

The spacing of the shoulders 13 and 14 prevents rapid reversals and makes quite a variation of pressure necessary to cause a reversal. This is desirable to avoid fluttering of the apparatus.

What I claim as new is:—

1. In a meter apparatus, the combination of a main conduit; a shunt conduit; a meter in the shunt conduit; a large capacity meter in the main conduit; a cut-off valve in the main conduit; a cut-off valve controlling means actuating said cut-off valve; a restriction in the shunt conduit; a differential pressure responsive means connected with the high and low sides of the shunt conduit including a liquid subjected to the differential pressure and a float carried by the liquid; a control valve; means actuated by the float for controlling the control valve; and a pressure connection to the cut-off valve controlling means controlled by said control valve.

2. In a meter apparatus, the combination of a main conduit; a shunt conduit; a meter in the shunt conduit; a large capacity meter in the main conduit; a cut-off valve in the main conduit; a cut-off valve controlling means actuating said cut-off valve; a restriction in the shunt conduit; a differential pressure responsive means connected with the high and low sides of the shunt conduit including a liquid subjected to the differential pressure and a float carried by the liquid; a tilting frame, a lost motion connection between the tilting frame and float; a control valve; means actuated by said tilting frame controlling the control valve; and a pressure connection to the cut-off valve controlling means controlled by said control valve.

3. In a meter apparatus, the combination of a main conduit; a shunt conduit; a meter in the shunt conduit; a large capacity meter in the main conduit; a cut-off valve in the main conduit; a cut-off valve controlling means actuating said cut-off valve; a restriction in the shunt conduit; a differential pressure responsive means connected with the high and low sides of the shunt conduit including a liquid subjected to the differential pressure and a float carried by the liquid; a tilting frame carrying a liquid-loaded tilting tube; an actuating connection between the tilting frame and the float; a control valve; means actuated by said tilting frame controlling the control valve; and a pressure connection to the cut-off valve controlling means controlled by said control valve.

4. In a meter apparatus, the combination of a main conduit; a shunt conduit; a meter in the shunt conduit; a large capacity meter in the main conduit; a cut-off valve in the main conduit; a cut-off valve controlling means actuating said cut-off valve; a restriction in the shunt conduit; a differential pressure responsive means connected with the high and low sides of the shunt conduit including a liquid subjected to the differential pressure and a float carried by the liquid; a tilting frame; a lost motion connection between the float and tilting frame; a rocker carrying a control valve actuated by the frame; and a pressure connection to the cut-off valve controlling means controlled by said control valve.

5. In a meter apparatus, the combination of a main conduit; a shunt conduit; a meter in the shunt conduit; a large capacity meter in the main conduit; a restriction in the shunt conduit; a chamber connected with the high and low sides of the shunt conduit; a cut-off valve in the main conduit; a cut-off valve controlling means actuating said cut-off valve; means within the chamber comprising a liquid subjected to the differential pressure; a float actuated by the liquid; a control valve; a pressure connection to the cut-off valve controlling means controlled by said control valve; a tilting frame; means operated by said tilting frame for actuating said control valve; and a lost motion connection between the float and tilting frame.

6. In a meter apparatus, the combination of a main conduit; a shunt conduit; a meter in the shunt conduit; a large capacity meter in the main conduit; a restriction in the shunt conduit; a chamber connected with the high and low sides of the shunt conduit; a cut-off valve in the main conduit; a cut-off valve controlling means actuating said cut-off valve; means within the chamber comprising a liquid subjected to the differential pressure; a float actuated by the liquid; a control valve; a pressure connection to the cut-off valve controlling means controlled by said control valve; a tilting frame; means operated by said tilting frame for actuating said control valve, said frame carrying a liquid-loaded tilting tube; and a lost motion connection between the float and the tilting frame.

7. In a meter apparatus, the combination of a main conduit; a shunt conduit; a meter in the shunt conduit; a large capacity meter in the main conduit; a restriction in the shunt conduit; a chamber connected with the high and low sides of the shunt conduit; a cut-off valve in the main conduit; a cut-off valve controlling means actuating said cut-off valve; means within the chamber comprising a liquid subjected to the differential pressure; a float actuated by the liquid; a control valve; a pressure connection to the cut-off valve controlling means controlled by said control valve; a tilting frame; a lost motion connection between the float and frame; and a rocker actuating the control valve, said rocker being actuated by said frame.

JOHN C. DIEHL.